July 6, 1937.  G. F. SHOTTER  2,086,444
APPARATUS FOR TRANSMITTING INDICATIONS TO A DISTANCE
Filed July 26, 1933  2 Sheets-Sheet 1
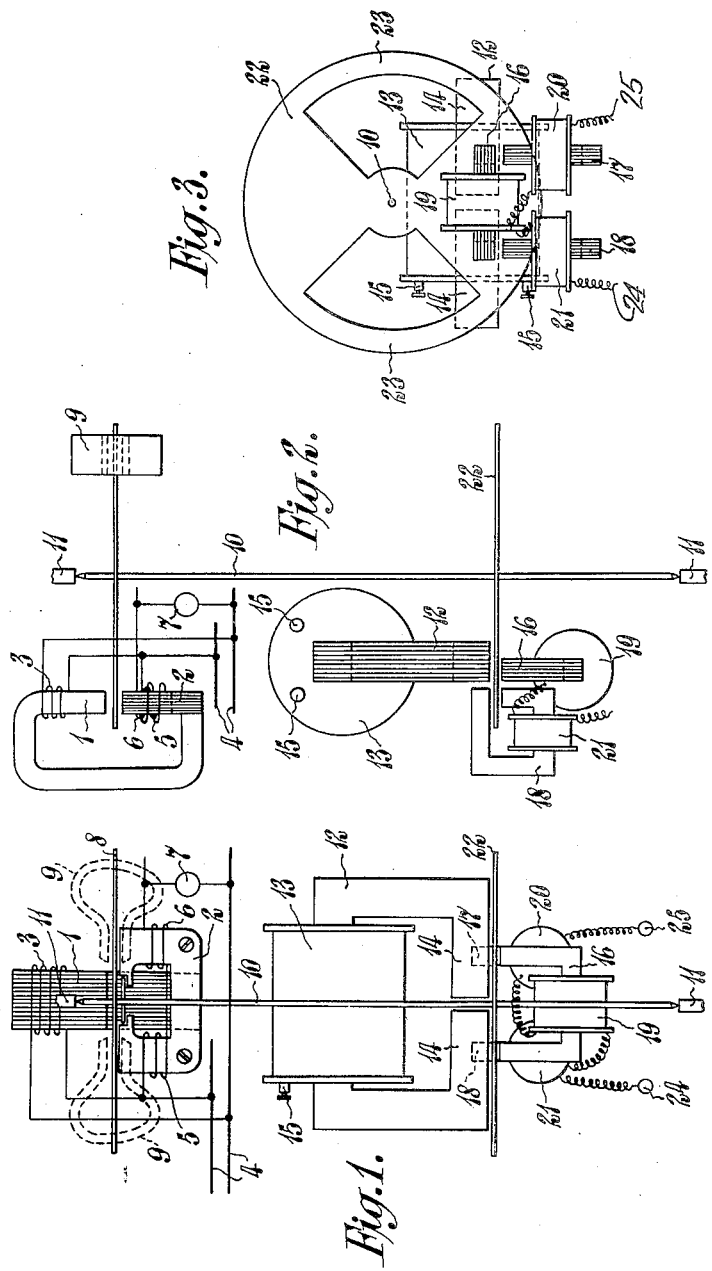
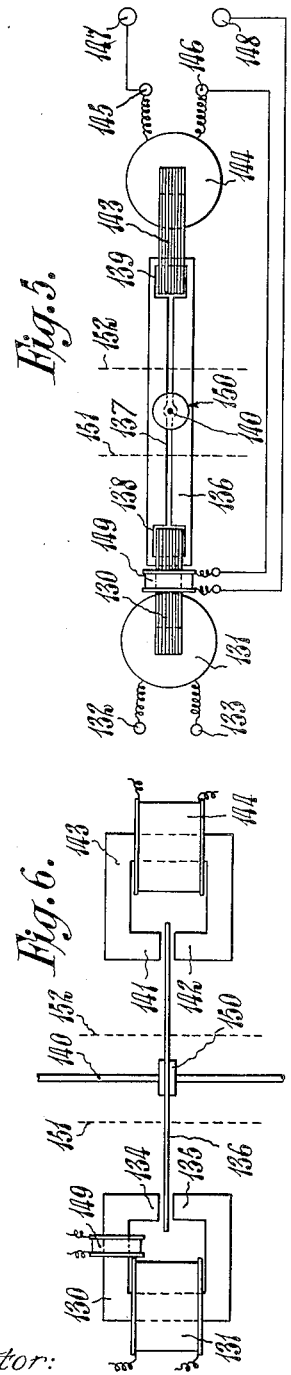
Inventor:
George Frederick Shotter July 6, 1937.  G. F. SHOTTER  2,086,444
APPARATUS FOR TRANSMITTING INDICATIONS TO A DISTANCE
Filed July 26, 1933  2 Sheets-Sheet 2
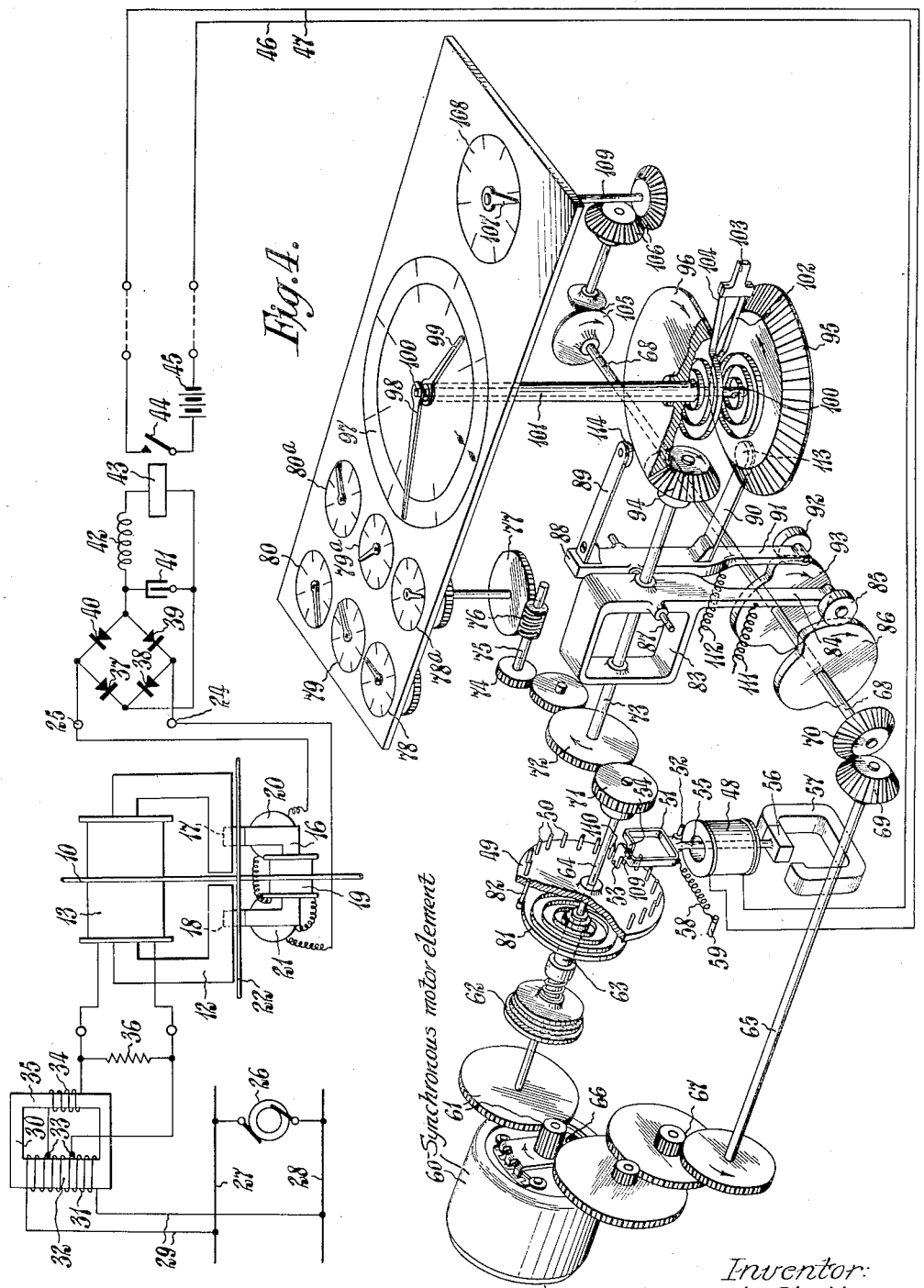

Patented July 6, 1937

2,086,444

UNITED STATES PATENT OFFICE 2,086,444

APPARATUS FOR TRANSMITTING INDICATIONS TO A DISTANCE

George Frederick Shotter, Friern Barnet, London, England

Application July 26, 1933, Serial No. 632,184
In Great Britain August 5, 1932

9 Claims. (Cl. 177—351)

The present invention relates to apparatus for transmitting movements to a distance and has for its object an arrangement whereby the forces exerted by the transmitting elements on the device which is moving, which may, for instance, be the rotating element of a watt-hour meter, are negligible.

One of the features of the present invention concerns an apparatus for producing impulses of alternating magnetic flux corresponding in number to the extent of movement of a movable member to enable such extent of movement to be transmitted to a distant point, without employing operating contacts on the movable member.

Another feature of the invention, broadly stated, relates to an arrangement comprising two magnetic circuits and a conducting member having its movement controlled by the movable member. An alternating flux preferably of constant magnitude, is applied to one magnetic circuit and the movement of the conducting member intermittently causes the first magnetic circuit to produce flux changes in the second magnetic circuit as it moves.

Preferably the changes in magnetic flux cause impulses of alternating current to be induced in a secondary circuit which on rectification operates a relay to send impulses to a distant station.

A further feature of the invention relates to the provision of indicating devices at the receiving end of the line. These indicating devices comprise a series of integrating pointers which give an indication of the total power consumed in the load circuit at the transmitting point and two further pointers which alternately serve to indicate the load consumption over the last completed predetermined period of time to indicate the load consumption which has taken place since the beginning of the pending period. A fourth indicating pointer serves to indicate the extent of the pending period of time which has elapsed at any instant.

These and other features of the invention not specifically mentioned will be understood from the following description, taken in conjunction with the accompanying drawings, in which:

Fig. 1 shows a front view of one form of apparatus employed for transmitting impulses.

Fig. 2 shows a side view of Fig. 1.

Fig. 3 shows an underside view of Fig. 1.

Fig. 4 shows the circuit arrangements employed when using the apparatus shown in Figs. 1, 2, and 3.

Fig. 5 shows an elevation of an alternative form of apparatus employed for transmitting impulses, and Fig. 6 shows a plan view of Fig. 5.

The embodiments shown in the drawings are designed for the purpose of transmitting impulses over a line to operate a recording instrument in accordance with the power consumption in a circuit. The power consumption is measured at the transmitting end by means of a wattmeter of any known type. As shown in Figs. 1 and 2 the wattmeter elements comprise the well known C-shaped voltage core 1 and U-shaped series core 2. The voltage core 1 is provided with a winding 3 connected across the supply line 4 while the series core 2 is provided with two windings 5 and 6 one on each limb, these windings being in series with the load 7 and the two conductors of the supply line. A disc 8 of electro-conducting material, preferably aluminium is arranged to rotate in the air gap formed between the pole pieces of the voltage and series cores, the rate of rotation of the disc being damped by a pair of braking magnets 9. The disc 8 is mounted on a spindle 10 held in suitable bearings 11. The operation of a wattmeter of this type is well known and hence a description thereof will not be given.

The apparatus for transmitting impulses in accordance with the speed of rotation of the disc 8 comprises a core 12 of magnetic material provided with a winding 13 to which is applied an alternating voltage preferably of constant magnitude. The pole pieces 14 of the core 12 are inturned towards each other and a small air gap exists between them. The alternating voltage is applied to the winding 13 through two terminals 15 shown in Fig. 2. A second core 16 of magnetic material is positioned with its pole pieces below and opposite the pole pieces of the core 12 and spaced a short distance therefrom. Two further cores 17 and 18 of magnetic material are also arranged so that the air gap between their pole pieces is opposite the air gaps formed by the pole pieces of the core 12 and the core 16. Each of the cores 16, 17, and 18 is provided with windings 19, 20, and 21 respectively and these windings are connected in series in the order winding 21, winding 19, winding 20.

On the same spindle 10 as the rotating disc 8 is mounted a further disc 22 made of conducting material preferably copper and arranged to rotate in the air gap formed by the four cores 12, 16, 17, and 18 as shown in Figs. 1 and 2. Two opposite quadrants of this disc are cut out as shown in Fig. 3 so that thin rings 23 of conducting material are left round the circumference of the cut-out quadrants.

The operation of the apparatus is as follows: An alternating voltage of substantially constant magnitude is applied to the terminals 15 of the winding 13. This alternating voltage traversing the winding 13 gives rise to an alternating flux in the core 12. Assume that the disc is in such a position as regards the gaps in it that little or no flux in the air gap cuts the conducting portion of the disc then there will be a certain amount of leakage flux passing from the core 12 to the cores 17 and 18 and to the core 16. These fluxes will pass round the cores and induce currents in the windings 20, 21 and 19 respectively. Now these three windings are arranged in series and by connecting up the coils with particular regard to the direction of the coil windings it is so arranged that the current in the winding 19 is of the same magnitude but opposite in direction to the current in the two windings 20 and 21. These currents cancel out so that the resultant current at the terminals 24 and 25 is zero. When conducting material is introduced into the air gap the leakage flux to the cores 16, 17 and 18 is not altered but in addition a further magnetic flux will be set up in the cores 17 and 18. This flux is due to the fact that with conducting material in the air gap, the leakage flux passing from the core 12 to the core 16 will give rise to eddy currents in the conducting material and the field set up by the eddy currents will cause an additional flux to be induced in the cores 17 and 18. This flux induces a current in the windings 20 and 21 which is additional to and in the same direction as the current due to the leakage flux alone. The balance of current in the three windings 19, 20 and 21 is thus upset and current will flow to the line.

From the construction of the disc 22 it will be seen that for each revolution of the disc and hence for each revolution of the wattmeter disc 3, two impulses of alternating current are transmitted. Hence variation in the speed of rotation of the wattmeter disc, which depends on the consumption of power in the load circuit, is signified by the number of impulses transmitted during a definite period of time. If these impulses are arranged to operate a step-by-step mechanism an indication will be given as to the power consumption in the load circuit. The apparatus at the receiving station for giving this indication will be described later.

Referring now to Fig. 4 this shows the circuit arrangements employed when using the transmitting apparatus illustrated in Figs. 1, 2 and 3. The alternating voltage for the winding 13 can be obtained from any alternating current supply which is represented for convenience by the alternating current generator 26, the busbars 27 and 28 and the conductors 29. It will be appreciated that it is desirable that the alternating voltage applied to the winding 13 should be of substantially constant magnitude. For this purpose, an auto-transformer is located between the alternating voltage source 26 and the winding 13, and comprises a rectangular core 30 having a winding 31 wound on the limb 32. The output from the auto-transformer is taken from the points 33, and in one side of the output circuit is arranged a balancing winding 34 wound on the limb 35 of the core 30. This balancing coil is inserted for the purpose of maintaining constant the alternating voltage in the output circuit. The limb 35 is made with a smaller cross-sectional area than the limb 32, and is of such dimensions that it is saturated over the working range of the instrument. Further, the windings 31 and 34 are connected in such a manner that the electromotive force induced across the terminals of the winding 34 is in opposition to the electromotive force across the terminals 33, and exceeds it by the electromotive force required for the output circuit. It will be appreciated that with a sufficiently strong magnetizing force on the limb 32 the limb 35 will become saturated, so that variations of magnetizing force will have a reduced effect on the winding 34. At the same time the electromotive force across the terminals 33 will be measured at a uniform rate with the result that the electromotive force across the resistance 36 will be substantially constant over quite a wide variation of potential of the alternating current source. A resistance 36 is inserted across the output circuit of the auto-transformer to provide a substantially constant load.

This load is then applied to the winding 13 on the core 12. The operation of this part of the system which is of course identical with Fig. 1 will not be further described.

The alternating current impulses in the output circuit of the three series connected windings 19, 20 and 21 are taken from the terminals 24 and 25 and applied to a full-wave rectifier comprising four dry rectifiers 37, 38, 39 and 40 connected up in the well-known bridge formation. A smoothing device comprising a condenser 41 and inductance 42 are connected up in the output circuit and the direct current impulses serve to operate a relay 43. Relay 43 in operating closes at contact 44 a circuit over the line. This circuit includes a current source 45 at the transmitting station the two line conductors 46 and 47 and a relay winding 48 at the receiving station. The function of the relay 43 is to repeat the impulses from the output circuit of the rectifier over the line to the relay winding 48 which controls the receiving equipment.

A description will now be given of the receiving equipment and in this connection it should be pointed out that it is the rate at which impulses are transmitted over the line which gives a measure of the power consumption in the circuit at the transmitting end. Since the rate of transmission of impulses varies, the length of the impulses will vary when using the apparatus in question. It is obvious therefore that all that is required at the receiving station is a stepping mechanism which is operated by each impulse to allow a shaft to make one step. In the construction shown in Fig. 4, the mechanism takes the form of an escapement device and comprises a disc 49 provided with a number of pins 50 arranged around its circumference. A frame 51 pivoted at 52 is provided with two arms 53 and 54, one of the pins on the disc, for example, normally resting against the arm 54. Connected to the frame 51 is an arm 55 of magnetic material which acts as a support for the winding 48 and to the end of which is attached a soft iron armature 56. This armature 56 is located between the pole pieces of a permanent horseshoe magnet 57. The frame 51 is spring biased to the position shown in the drawings by the spring 58 fixed at the point 59.

A driving connection is effected to the disc 49 from the synchronous motor 60. This motor drives a shaft 63 through gearing 61 and a friction clutch 62. The shaft 63 serves as a bearing for the shaft 64 on which the disc 49 is rigidly mounted. One end of the coil spring 81 is attached to the shaft 63, the other end of the spring being attached to a pin 82 on the disc 49. The object of the spring is to form an energy storing device to make up for any lag on the part of the motor when the disc 49 is being rotated step-by-step. The motor 63 also drives a shaft 65 through gearing 66, 67, the shaft 65 driving a further shaft 68 through two bevel gears 69, 70. The mechanism associated with the shaft 68 will be described later.

The shaft 64 is provided with a gear wheel 71 meshing with a gear wheel 72 mounted on a shaft 73. The wheel 72 drives a gear wheel 74, which through the medium of the shaft 75, worm 76 and gear wheel 77 controls the operation of the integrating indicators 78, 78a, 79, 79a, 80 and 80a to give an indication of the total power consumption in the circuit.

Loosely mounted on the shaft 73 is a frame 83 having an extension 84 to the end of which is attached a roller 85. The roller 85 is operated by a cam 86 rigidly mounted on the shaft 68. The frame 83 is pivoted at 87 while to the same pivot is attached a second frame 88 provided with two arms 89 and 90. An extension 91 of the frame 88 is provided with a roller 92 which bears on a second cam 93 also rigidly mounted on the shaft 68. To the end of the shaft 73 is connected a bevel wheel 94 which engages with one or other of the two crown wheels 95 and 96.

These crown wheels form part of a load indicating device which comprises a dial 97 provided with two pointers 98 and 99. The pointer 98 is attached to a spindle 100 which carries the crown wheel 95 while the pointer 99 is attached to the sleeve 101 which carries the crown wheel 96. One end of the coil spring 102 is attached to the crown wheel 95, the other end being attached to a fixed pin 103. A second coil spring 104 is similarly attached to the crown wheel 96 and the pin 103.

The shaft 68 also drives a shaft 109 through bevel gearing 105 having a 2:1 ratio and bevel gearing 106 having 1:1 ratio. The shaft 109 drives a pointer 107 which rotates over the dial 108.

A description will now be given of the operation of the receiving equipment. An impulse incoming to the winding 48, causes the soft iron armature 56 to be magnetized to a polarity opposite to that of the pole piece of the magnet 57 against which it is normally in contact. The armature will therefore be repelled and the frame 51 will pivot about 52. The arm 54 will thereupon be moved out of the path of the pin 109 on the disc 49. The motor drive is so arranged that the disc is rotated in a clockwise direction. It will be understood that when the arm 54 is removed from the path of the pin 109 the disc will commence to rotate. This rotation will cease when the next pin 110 meets the arm 53. At the termination of the impulse the armature 56 will revert to its original position and the arm 53 will be moved out of the path of the pin 110 so that the disc will make another rotary movement.

The rotary movement of the disc 49 is transmitted through the shaft 64 to the gear wheel 71. The gear wheel 71 meshes with the gear wheel 72 and further transmits the drive to the shaft 73 and also through an intermediate gear wheel to the gear wheel 74 causing a movement of one of a series of integrating pointers 78, 78a, 79, 79a, 80 or 80a whereby an indication of the total power consumption in the load circuit may be given. Further the shaft 73 causes the rotation of the bevel wheel 94 and assuming the apparatus to be in the position shown in the drawings, that is to say, the bevel wheel 94 meshes with the crown wheel 96 the latter will be rotated and the pointer 99 will be moved over the dial 97. The pointer 99 is made shorter than the pointer 98 and moves over a different scale since it will be appreciated from the description which follows that the two pointers are rotated in opposite directions and the use of a single scale may lead to confustion.

The bevel wheel 94 remains in engagement with the crown wheel 96 for a predetermined time which may be, for instance, fifteen seconds. At the termination of this period the crown wheel 96 is locked against further rotation by brake 114 so that the pointer 99 remains in its operated position. Further, the shaft 73 is now rocked so that the bevel wheel 94 is disengaged from the crown wheel 96 and engages with the crown wheel 95 whereupon on the reception of further impulses over the line the pointer 98 is rotated. The pointer 99 remains in its operated position until the end of the next fifteen second period when it is reset to normal. It will be appreciated therefore that during any particular period one of the pointers is intermittently rotated by impulses incoming over the line while the other pointer shows the load upon the circuit for the previous period.

A description will now be given of the arrangement whereby the drive is transferred from the crown wheel 96 to the crown wheel 95. It will be remembered that two cams 86 and 93 are rigidly fixed on the shaft 68. Both these cams comprise a raised portion which extends over half the circumference, and as the cams are rotated by the shaft 68 the rollers 85 and 92 will be operated upon by the cam surfaces since they are pressed against the surfaces by springs 111 and 112 respectively. The cams, however, are mounted on the shaft 68 in such a manner that the cams are displaced angularly with respect to one another. As the shaft is rotated and assuming the rollers to be on the raised portions of the cam surfaces as shown in the drawings, the lower portion of the cam 93 is reached by roller 92 prior to the lower portion of the cam 86 being reached by the roller 85.

As the roller 92 drops on to the lower surface a frame 88 will pivot about 87 so that the stud 113 attached to the arm 90 will be moved from the surface of the crown wheel 95, whereupon the spring 102 which was tensioned when the crown wheel 95 was operated causes the restoration of the pointer 98 to normal, while the stud 114 attached to the arm 89 is pressed against the surface of the crown wheel 96 so that the pointer 99 is locked in its operated position. The displacement of the cams 86 and 93 is necessary so that the stud 114 locks the crown wheel 96 before the bevel wheel 94 disengages from the teeth thereof. Disengagement of the bevel wheel is caused by the rocking movement of shaft 73 about the pivot 87, the rocking movement being transmitted thereto by the frame 83. This sequence of operations may be briefly stated as follows: At the end of the operating period for the pointer 99 the frame 83 is rocked whereupon the stud 114 brakes the crown wheel 96 while the stud 113 releases the crown wheel 95 which restores to normal whereupon the frame 83 is rocked and the bevel wheel 94 is disengaged from the crown wheel 96 and engages with the crown wheel 95 whereupon the drive is transmitted to the pointer 98.

The pointer 107 which rotates over the dial 108 is so arranged that it makes one complete revolution for every half revolution of the shaft 68. This pointer is adjusted so that at the commencement of a period it will be in the zero position so that it will be appreciated that at any moment the reading of this pointer gives an indication of the time which the particular period has to run before its termination.

It will be appreciated that the shaft 68 is rotated continuously, while the shaft 73 which controls the movements of the pointers 98 and 99 is rotated intermittently by the reception of impulses. Hence the changeover from one indicating pointer 98 to the other indicating pointer 99 takes place continuously whether any impulses are incoming or not.

A further method of transmitting impulses is shown in Figs. 5 and 6. In these figures a core 130 of magnetic material is provided with a winding 131 to which is applied at the terminals 132 and 133 an alternating voltage, preferably of constant magnitude. The magnetic core 130 has inturned pole pieces 134 and 135, between which is a small air gap. A strip 136 of conducting material, for instance, copper, and having a central slot 137 terminating in two cut-out portions 138 and 139 one at each end of the strip, is mounted on a spindle 140 on which is also mounted the rotating element of the watt meter in a similar manner to that shown in Fig. 1. As one end of the strip passes through the air gap formed by the pole pieces 134 and 135, the other end passes through an air gap formed by the pole pieces 141 and 142 of a magnetic core 143 provided with a winding 144. The winding 144 is brought out to the terminals 145 and 146 which are connected either directly to terminals 147 and 148, or, if necessary, in series with a compensating winding 149 located on the magnetic core 130. The spindle 140 is insulated from the copper strip 136 by an insulating bush 150, while iron screens 151 and 152 may, if necessary, be provided for preventing any interaction of leakage flux from one core to the other.

The operation of this arrangement is as follows: When the copper strip enters the magnetic field set up by the flux in the core 130, currents will be caused to flow round the copper strip. These currents, by virtue of the slot in the strip, will take a definite path round the strip, and will induce an alternating flux into the core 143. This alternating flux will give rise to an alternating current in the winding 144.

The purpose of the winding 149 is to compensate for any leakage flux which may pass from the core 130 to the core 143. This leakage flux will induce a current in the winding 144. Further a current is induced in the winding 149 due to the alternating flux in the core 130 and the winding 149 is so arranged that the current therein is of the same magnitude but of opposite direction to the current in the coil 144 due to the leakage flux. The two currents therefore cancel out and the resultant current at the terminals 145 and 146 is zero.

I claim:

1. A device for producing impulses of alternating current corresponding in number to the extent of movement of an integrating meter element, comprising a magnetic circuit, a second magnetic circuit, means for intermittently and inductively linking said first magnetic circuit with said second magnetic circuit, an integrating meter element the extent of movement of which is to be determined, said integrating meter element being mechanically connected to said linking means to effect the movement of said linking means, and means controlled by said second magnetic circuit and responsive, when said first and second magnetic circuits are linked together, to cause the generation of an electric current impulse.

2. A device for producing impulses of alternating current corresponding in number to the extent of movement of an integrating meter element, comprising a magnetic circuit, a source of alternating current, a coil embracing said magnetic circuit and connected to said source, a second magnetic circuit, a coil embracing said second magnetic circuit, means for intermittently and inductively linking said first magnetic circuit with said second magnetic circuit, an integrating meter element the extent of movement of which is to be determined, said integrating meter element being mechanically connected to said linking means to effect the movement thereof, and means controlled by said second magnetic circuit and responsive, when said first and second magnetic circuits are linked together to cause the generation of an electric current impulse in said second coil.

3. A device for producing impulses of alternating current corresponding in number to the extent of movement of an integrating meter element, comprising a magnetic circuit, a source of alternating current, a coil embracing said magnetic circuit and connected to said source, a second magnetic circuit, a coil embracing said second magnetic circuit, means for compensating for the alternating current induced in said second coil due to leakage flux from said first magnetic circuit, means for intermittently and inductively linking said first magnetic circuit with said second magnetic circuit, an integrating meter element the extent of movement of which is to be determined, said integrating meter element being mechanically connected to said linking means to effect the movement thereof, and means controlled by said second magnetic circuit and responsive, when said first and second magnetic circuits are linked together to cause the generation of an electric current impulse in said second coil.

4. A device for producing impulses of alternating current corresponding in number to the extent of movement of an integrating meter element comprising a magnetic circuit, a source of alternating current, a coil embracing said magnetic circuit and connected to said source, a second magnetic circuit, a coil embracing said second magnetic circuit, a third magnetic circuit, a coil embracing said third magnetic circuit and connected in series with said second coil, the coil windings of said second and third magnetic circuits being disposed with respect to said first magnetic circuit that the current induced by the leakage flux from said first magnetic circuit in said second coil is of the same magnitude but opposite in direction to the current induced by the leakage flux from said first magnetic circuit in said third coil, means for intermittently and inductively linking said first magnetic circuit with said second magnetic circuit, an integrating meter element the extent of movement of which is to be determined, said integrating meter element being mechanically connected to said linking means to effect the movement thereof, and means controlled by said second magnetic circuit and responsive, when said first and second magnetic circuits are linked together to cause the generation of an electric current impulse in said second coil which is unaffected by the electric current impulses generated therein by the leakage flux from said first magnetic circuit.

5. A device for producing impulses of alternating current corresponding in number to the extent of movement of an integrating meter element comprising a magnetic circuit, a second magnetic circuit, means for exciting said first magnetic circuit with alternating flux, means for intermittently and inductively linking said first magnetic circuit with said second magnetic circuit, an integrating meter element the extent of movement of which is to be determined, said integrating meter element being mechanically connected to said linking means to effect the movement thereof, said linking means being adapted to have current induced therein by said first magnetic circuit or not according as to whether it inductively links said first and second magnetic circuits or not on movement of said integrating meter element, the current, when induced in said linking means, being adapted to react on said second magnetic circuit to cause the generation of an electric current impulse.

6. A device for producing impulses of alternating current corresponding in number to the extent of movement of an integrating meter element comprising a magnetic circuit, a second magnetic circuit positioned with respect to said first magnetic circuit so that it forms an air gap therewith, means for exciting said first magnetic circuit with alternating flux, a conductor member disposed in said air gap for intermittently and inductively linking said first magnetic circuit with said second magnetic circuit, an integrating meter element mechanically connected to said conductor member to effect the movement thereof, said conductor member having a discontinuous surface and being adapted to have current induced in it by said first magnetic circuit or not, according to the position of its surface with respect to said first magnetic circuit upon movement of said integrating meter element, the current, when induced in said conductor member, being adapted to react on said second magnetic circuit to cause the generation of an electric current impulse.

7. A device for producing alternating current impulses corresponding in number to the extent of movement of an integrating meter element comprising a magnetic circuit, a second magnetic circuit positioned with respect to said first magnetic circuit so that it forms an air gap therewith, means for exciting said first magnetic circuit with alternating flux, a circular disc of conducting material disposed in said air gap for intermittently and inductively linking said first magnetic circuit with said second magnetic circuit, an integrating meter element the extent of movement of which is to be determined, said integrating meter element being mechanically connected to said disc to effect the movement thereof, said disc of conducting material having a gap therein and being adapted to have current induced in it by said first magnetic circuit or not according to the position of the gap with respect to said circuit upon movement of said integrating meter element, the current when induced in said disc being adapted to react on said second magnetic circuit to cause the generation of an electric current impulse.

8. A device for producing current impulses corresponding in number to the extent of movement of an integrating meter element comprising a magnetic circuit having an air-gap, a second magnetic circuit also having an air-gap, means for exciting said first magnetic circuit with alternating flux, a strip of conducting material for intermittently and inductively linking said first magnetic circuit with said second magnetic circuit, an integrating meter element the extent of movement of which is to be determined, said integrating meter element being mechanically connected to said strip to effect the movement thereof, said strip having a central slot and being adapted to be rotated by said integrating meter element and embrace the flux passing through the air-gap of the first magnetic circuit at the same time as it is in the air-gap of the second magnetic circuit, whereby current will be induced in it by said first magnetic circuit or not according to its position with respect to the gaps of said circuits, the current, when induced in said strip being adapted to react on said second magnetic circuit to cause the generation of an electric current impulse.

9. In combination in a system for determining the extent of movement of an integrating meter element, a magnetic circuit, a second magnetic circuit, means for intermittently and inductively linking said first magnetic circuit with said second magnetic circuit, an integrating meter element the extent of movement of which is to be determined, said integrating meter element being mechanically connected to said linking means to effect the movement of said linking means, means controlled by said second magnetic circuit and responsive, when said first and second magnetic circuits are linked together, to cause the generation of an electric current impulse, and registering means responsive to each electric current impulse to give an indication of the number of impulses transmitted.

GEORGE F. SHOTTER.